US011341072B2

(12) United States Patent
Blanco et al.

(10) Patent No.: US 11,341,072 B2
(45) Date of Patent: May 24, 2022

(54) METHOD FOR CONTROLLING COMMANDS SUITABLE TO BE PROCESSED BY A PERIPHERAL SUCH AS AN ACTUATOR

(71) Applicant: Idemia Identity & Security France, Courbevoie (FR)

(72) Inventors: Fabien Blanco, Courbevoie (FR); Jean-Yves Bernard, Courbevoie (FR); Emmanuelle Dottax, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/911,793

(22) Filed: Jun. 25, 2020

(65) Prior Publication Data
US 2021/0011871 A1 Jan. 14, 2021

(30) Foreign Application Priority Data
Jul. 11, 2019 (FR) ..................................... 1907790

(51) Int. Cl.
*G06F 13/38* (2006.01)
*G06F 13/40* (2006.01)
(Continued)

(52) U.S. Cl.
CPC ........ *G06F 13/385* (2013.01); *G06F 13/4063* (2013.01); *G06F 21/64* (2013.01); *G06F 2213/3808* (2013.01); *H04L 63/02* (2013.01)

(58) Field of Classification Search
CPC ............... G06F 13/385; G06F 13/4063; G06F 2213/3808; G06F 21/64
See application file for complete search history.

(56) References Cited

U.S. PATENT DOCUMENTS 7,721,346 B2 * 5/2010 Hori .................. G11B 20/00086
726/30
8,667,589 B1 3/2014 Saprygin
(Continued)

FOREIGN PATENT DOCUMENTS

EP 2 866 407 A1 4/2015
EP 3 016 017 A1 5/2016

OTHER PUBLICATIONS

Correspondence from the French National Institute of Industrial Property Office (INPI—Institute National De La Propriété Industrielle) for FR1907790 dated Mar. 5, 2020; Preliminary Research Report of the French National Institute of Industrial Property Office for FR1907790 dated Feb. 28, 2020; and Written Opinion on the Patentability of the Invention issued by the French National Institute of Industrial Property Office for FR1907790.
(Continued)

*Primary Examiner* — Brian T Misiura
(74) *Attorney, Agent, or Firm* — Womble Bond Dickinson (US) LLP

(57) ABSTRACT

Method for controlling commands suitable to be processed by a peripheral (2) comprising the following steps implemented by a control circuit (6) connected to a communication bus (8), a command circuit (4) and the peripheral (3) also being connected to the communication bus (8): granting or refusing authorization to the command circuit (4) to transmit a command signal of the peripheral via the bus (8), detecting the possible transmission of the command signal for the peripheral by the command circuit via the bus (8), implementing protection measures (614) when the control circuit detects that the command signal has been transmitted as the control circuit has not granted authorization, or that the command signal has not been transmitted as the control circuit has granted authorization.

14 Claims, 3 Drawing Sheets

(51) Int. Cl.
G06F 21/64 (2013.01)
H04L 29/06 (2006.01)

(56) References Cited

U.S. PATENT DOCUMENTS

| | | | |
|---|---|---|---|
| 8,990,923 B1 | 3/2015 | Saprygin | |
| 9,501,439 B1* | 11/2016 | Fredrickson | G06F 13/4068 |
| 10,063,375 B2 | 8/2018 | Thom et al. | |
| 2005/0102503 A1* | 5/2005 | Imai | G06F 21/445 |
| | | | 713/156 |
| 2007/0055803 A1* | 3/2007 | Fuchs | G06F 11/0724 |
| | | | 710/107 |
| 2015/0230108 A1* | 8/2015 | Sridhara | G06F 21/552 |
| | | | 455/405 |
| 2016/0196083 A1* | 7/2016 | Cho | G06F 13/16 |
| | | | 711/163 |
| 2016/0308677 A1* | 10/2016 | Thom | H04L 9/3234 |
| 2017/0147812 A1* | 5/2017 | Ujiie | H04L 12/28 |
| 2017/0249224 A1* | 8/2017 | Suzuki | G06F 11/2215 |
| 2017/0366026 A1* | 12/2017 | Todd | H02J 7/025 |
| 2019/0215234 A1* | 7/2019 | Bonnin | G06F 21/64 |
| 2019/0217869 A1* | 7/2019 | Takeuchi | G07C 5/0808 |
| 2020/0184068 A1* | 6/2020 | Blanco | G06F 9/3836 |

OTHER PUBLICATIONS

English machine translation of Correspondence from the French National Institute of Industrial Property Office (INPI—Institute National De La Propriete Industrielle) for FR1907790 dated Mar. 5, 2020; Preliminary Research Report of the French National Institute of Industrial Property Office for FR1907790 dated Feb. 28, 2020; and Written Opinion on the Patentability of the Invention issued by the French National Institute of Industrial Property Office for FR1907790.

* cited by examiner

[Fig. 1]
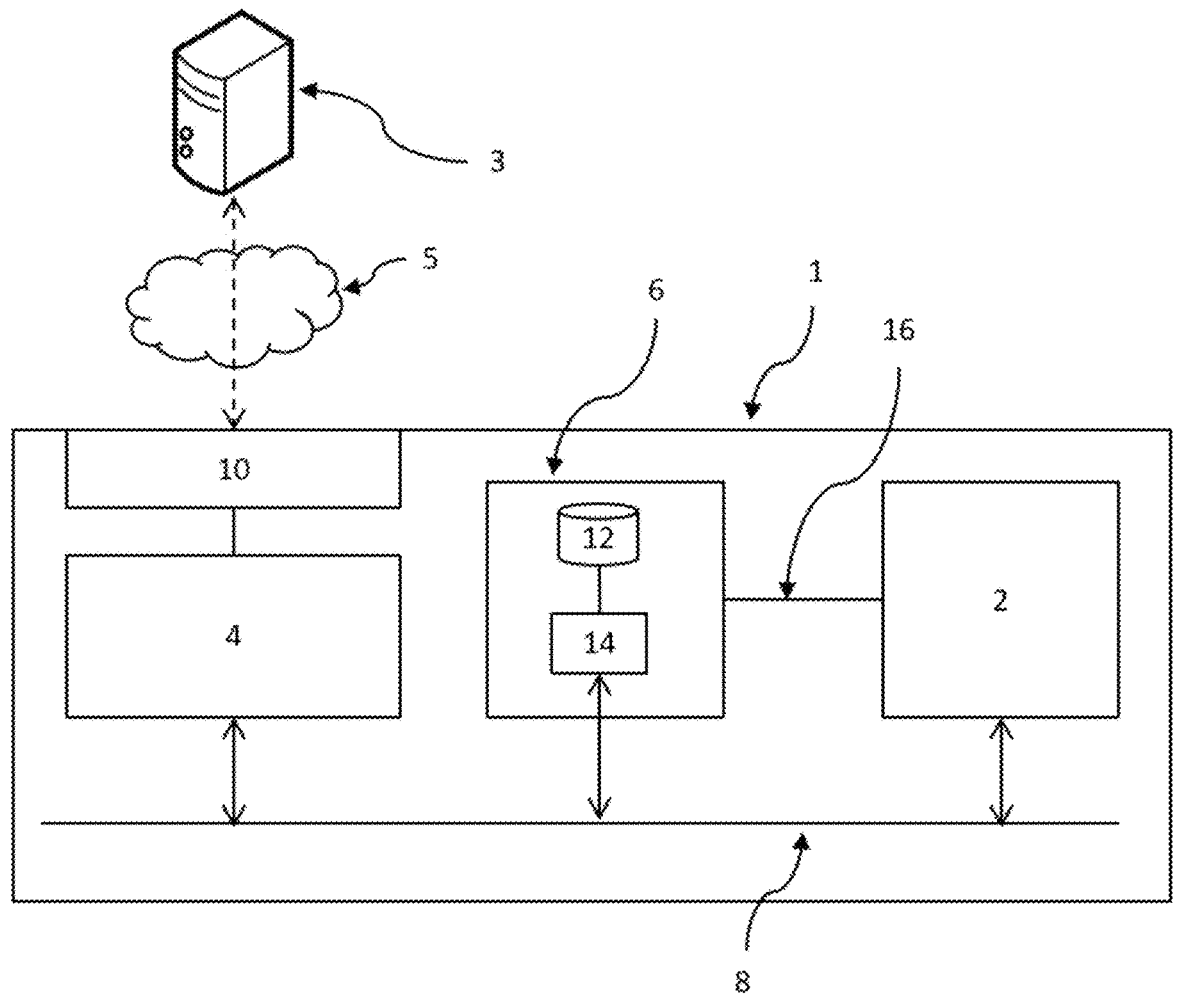
[Fig. 2]
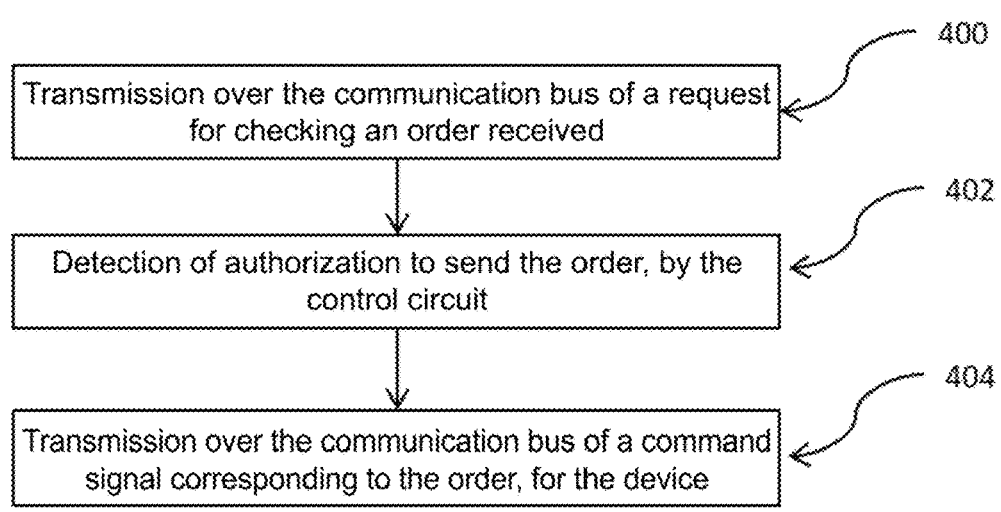

[Fig. 3]
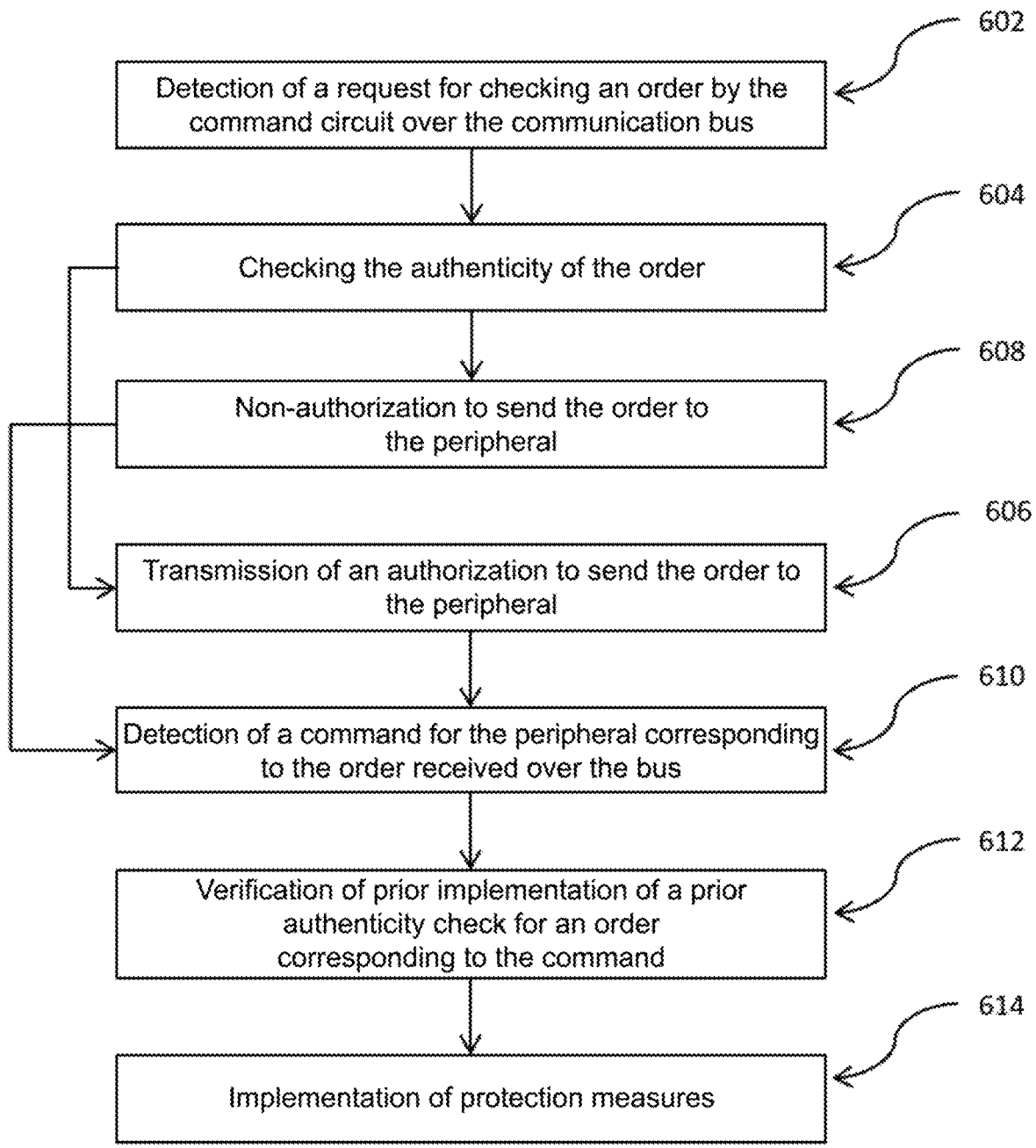

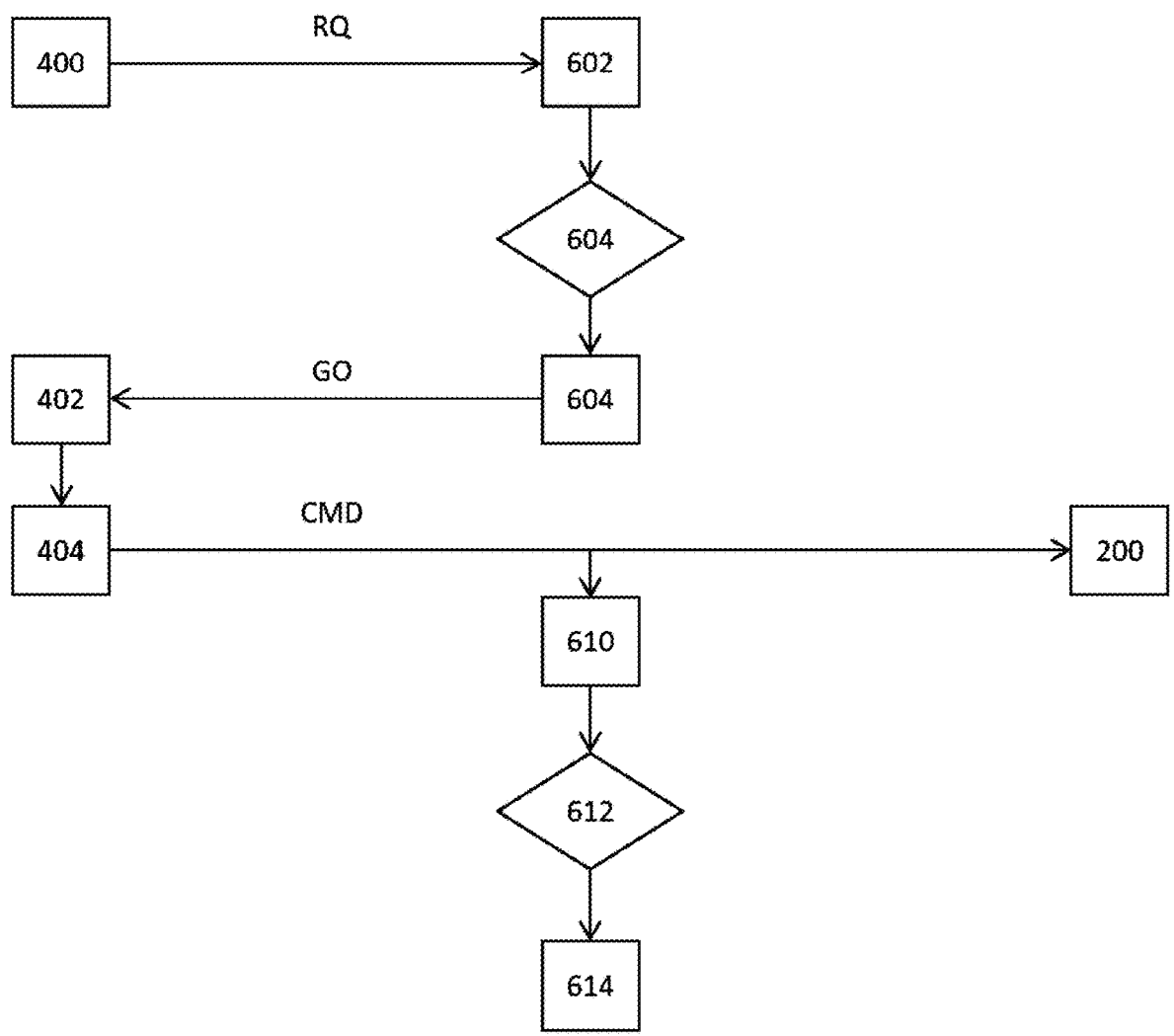
[Fig. 4]

METHOD FOR CONTROLLING COMMANDS SUITABLE TO BE PROCESSED BY A PERIPHERAL SUCH AS AN ACTUATOR

CROSS-REFERENCE TO RELATED APPLICATIONS

This specification is based upon and claims the benefit of priority from French patent application number FR 1907790 filed on Jul. 11, 2019, the entire contents of which are incorporated herein by reference.

TECHNICAL FIELD OF THE INVENTION

The present invention relates to a method for controlling commands suitable to be processed by a peripheral, such as an actuator. It also relates to a control circuit adapted for the implementation of this method.

Advantageously, the invention finds application in connected objects comprising such a peripheral.

STATE OF THE ART

A conventional connected object comprises a peripheral configured to accomplish tasks, on the basis of orders made by a remote trusted server.

The connected object generally comprises a command circuit configured to transmit to the peripheral a command corresponding to an order received. For example, the peripheral is an actuator, and the commands transmitted by the command circuit are intended to trigger actions by the actuator.

The command circuit and the peripheral communicate therebetween by a communication bus.

However, it is possible that inauthentic orders, i.e. not originating from the trusted server but from a malicious entity, may be received by the command circuit. These inauthentic orders may result in the transmission of unwanted commands to the peripheral.

To protect the connected object from such attacks, the remote server transmits to the connected object orders which have been electronically signed or encrypted using a first key. For its part, the command circuit verifies whether an order it receives is authentic, i.e. if the order received definitely originates from the remote server, by decryption or verification of the signature applied to the order received, using a second key forming a pair of cryptographic keys with the first key. If an order received is not considered authentic, the command circuit does not transmit via the communication bus a command corresponding to that order to the peripheral.

However, in many connected objects, the command circuit itself may not be secure. This notably implies that the command circuit may be subject to remote attacks originating from outside the connected object, and affecting its operation. A command circuit attacked in this way may, thus, allow itself to transmit to the peripheral commands based on inauthentic or non-existent orders.

OVERVIEW OF THE INVENTION

One object of the invention is to detect unauthorized attempts to control a peripheral, even in cases where the operation of the command circuit associated with that peripheral has been altered.

To that end, according to a first aspect, a method is proposed for controlling commands suitable to be processed by a peripheral such as an actuator, the method comprising the following steps implemented by a command circuit connected to a communication bus, a command circuit and the peripheral (3) also being connected to the communication bus:

granting or refusing authorization for the command circuit to transmit a command signal of the peripheral via the communication bus, detecting the possible transmission of the command signal of the peripheral by the command circuit via the communication bus, implementing protection measures when the control circuit detects that: the command signal has been transmitted by the command circuit via the communication bus although the control circuit has not granted authorization, or that the command signal has not been transmitted by the command circuit over the communication bus although the control circuit has granted authorization.

The method according to the first aspect may comprise the following optional features, either alone or combined, whenever this is technically possible.

Preferably, the authorization is not granted by the control circuit when the control circuit detects that the command signal for the peripheral is not based on an order authentically emitted by a predetermined server.

Preferably, the command control circuit is configured to verify whether the order has been electronically signed by the server and/or whether the order is accompanied by an authentication code generated by the server.

Preferably, the control circuit also implements the following steps:

storing an item of integrity data relating to the order prior to the control circuit granting or refusing authorization, if the command signal has been transmitted by the command circuit, implementing an integrity check of the command signal using the item of integrity data stored in memory, the protection measures being implemented if the integrity check reveals that the command signal is not correct.

Preferably, the protection measures comprise the server being sent an error message relating to the command of the peripheral.

Preferably, the method according to the first aspect comprises the server being sent a message indicating that the transmission of the command signal was authorized and then occurred, the message preferably being electronically signed or encrypted.

Preferably, the authorization is not granted by the control circuit when the control circuit detects that a period of validity for an order on which the command signal for the peripheral is based has expired.

Preferably, the protection measures comprise a block preventing the command signal, or indeed any command signal for the peripheral subsequently emitted by the command circuit over the communication bus, from being processed by the peripheral.

Preferably, the blocking comprises at least one of the following steps:

positioning a clock signal controlling the timing of the sending of data over the communication bus at a suitable level to interrupt the transmission of the command signal of the detected peripheral, before the detected command reaches the peripheral;

replacing an address designating the peripheral as a recipient of the detected command signal with a different address, emitting over the communication bus a suitable deactivation signal to place the peripheral in a deactivated configuration unsuitable for processing the detected command, the deactivation signal being, for example, a signal for resetting or interrupting the power supply of the peripheral.

Preferably, the protection measures comprise the emitting by the control device of a security command signal suitable for placing the peripheral in a predetermined secure configuration, for example, a predetermined secure position when the peripheral is an actuator.

Further proposed, according to a second aspect, is a control circuit for commands suitable to be processed by a peripheral such as an actuator, the command control circuit being configured to:

be connected to a communication bus connected to a command circuit and to the peripheral, grant or refuse authorization for the command circuit to transmit a command signal of the peripheral via the communication bus, check the possible transmission of the command signal of the peripheral by the command circuit via the communication bus, implement protection measures when the control circuit detects, during the verification, that the command signal has been transmitted by the command circuit via the communication bus although the control circuit has not granted authorization, or that the command signal has not been transmitted by the command circuit over the communication bus although the control circuit has granted authorization.

Further proposed, according to a third aspect, is a system comprising a peripheral, a command circuit, a command control circuit according to the second aspect, and a communication bus, wherein the peripheral, the command circuit and the control circuit are all connected to the communication bus.

Further proposed, according to a third aspect, is a connected object comprising a system according to the second aspect.

DESCRIPTION OF THE FIGURES

Other characteristics, goals, and advantages of the invention will become clear from the following description, which is purely illustrative and non-limiting, and which must be read in the context of the attached drawings in which:

FIG. 1 schematically illustrates a device according to a first embodiment of the invention.

FIG. 2 is a flow chart of the steps of a method according to an embodiment of the invention, these steps being implemented by a command circuit.

FIG. 3 is a flow chart of the steps of a method according to an embodiment of the invention, these steps being implemented by a command control circuit.

FIG. 4 illustrates some of the steps appearing in FIGS. 2 and 3, as well as steps implemented by an actuator and certain data transmitted between various components.

In the set of Figures, similar elements are marked with identical references.

DETAILED DESCRIPTION OF THE INVENTION a) Connected Object and Control Circuit

Referring to FIG. 1, a connected object 1 comprises a command circuit 4, a peripheral 2, a control circuit 6, a communication bus 8 and a communication interface 10 with a remote trusted server 3.

The remote server 3 is configured to transmit orders to the connected object 1, with the aim of making the peripheral 2 of the connected object 1 perform predetermined actions. In the present text, it is assumed that the term "order" refers to data representative of an order for the peripheral 2 to accomplish a task.

The server 3 is configured to electronically sign an order, or encrypt it, before it is sent to the connected object 1. To do this, the server 3 has a first key.

The communication interface 10 is capable of establishing a communication channel with the remote server 3, for example a wireless radio type channel (typically Wi-Fi, or cellular).

The command circuit 4, the peripheral 2 and the control circuit 6 are all connected to the communication bus 8.

The purpose of the command circuit 4 is to transmit command signals to the peripheral 2 over the communication bus 8, upon receipt of an order.

These command signals have a format interpretable by the peripheral 2.

By convention, in the present text, the term "command" refers to the form of a command signal transmitted over the communication bus 8 and which can be interpreted by the peripheral 2. As previously stated, the term "order" refers to data which are provided by the remote server 3, the command circuit 4 being capable of generating a command from such an order.

The command circuit 4 is connected to the communication interface 10 via a connection independent from the communication bus 8. Alternatively, the command circuit 4 includes the communication interface 10.

The peripheral 2 is configured to perform predetermined actions when it receives predetermined commands via the communication bus 8. Generally, the peripheral 2 is likely to have multiple configurations. An action typically causes the peripheral 2 to change configuration.

For example, the peripheral 2 is an actuator. In this case, an action by the actuator may consist of moving itself and/or moving another component. For example, the actuator controls a valve, i.e. it opens and closes the valve. Alternatively, the actuator illuminates a traffic light.

The control circuit 6 is connected to the same communication bus 8 as the command circuit 4 and as the peripheral 2. As such, the control circuit 6 communicates directly with both of these components.

The control circuit 6 can communicate with the remote server 3 only via the command circuit 4.

The control circuit 6 comprises a memory 12 and a data processing unit 14.

A second key is stored in the memory 12. The second key forms with the first key a pair of cryptographic keys. The two keys may be symmetric in that these two keys facilitate the implementation of symmetric cryptography, or asymmetric in that these two keys facilitate the implementation of asymmetric cryptography.

The processing unit 14 is configured to apply to data received via the bus 8 a processing operation aimed at authenticating the origin of these data. As detailed below, these data are in fact supposed to be orders generated by the remote server 3.

Furthermore, a connection 16 may connect the control circuit 6 to the peripheral 2 independently of the communication bus 8. The role of this connection 16 will be explained below.

b) Method for Controlling Commands for a Peripheral

Referring to FIGS. 2 to 4, a method implemented by the connected object 1 comprises the following steps.

The object receives an order originating externally via its communication interface 10. If that order is authentic, it originates from the remote server 3, and that order has been encrypted or signed by the remote server 3 using the first key.

The order received is transmitted to the command circuit 4.

The command circuit 4 emits over the communication bus 8 a first signal, which is a control request signal for the order received (step 400). The first signal transports the order received, and is addressed to the control circuit 6. The first signal is not addressed to the peripheral 2. In FIG. 4, this first signal is called "RQ".

At this stage, the command circuit 4 awaits feedback from the control circuit 6.

The control circuit 6 detects the first signal, and extracts the order received from it (step 602).

The processing unit 14 of the control circuit 6 implements an authenticity check on the order received (step 604).

The authenticity check 604 typically uses the second key stored in the memory 12. When the remote server 3 is configured to electronically sign the orders it sends, the authenticity check implemented by the control circuit 6 comprises a verification of the electronic signature appended to the order, using the second key.

The authenticity check 604 may also comprise a time validity check of the order received. The objective of this time validity check is to prevent any potential attack consisting of delaying the application of an authentic order, enabling the attacker to proceed with commanding the peripheral 2 at a later stage unwanted by the server 3. The general principle of this time validity check consists of assigning a period of time to an order during which that order may be sent to the peripheral 2 via a command signal. Once this period has elapsed, this permission ceases. The command circuit 4 is therefore configured to examine whether the period of time assigned to the order to be checked has expired. If it has, the order is considered authentic. Otherwise, the order is not considered to be authentic.

In practice, the time validity check may be implemented in several ways.

In a first embodiment, the control circuit 6 and the remote server 3 exchange—via the command circuit 4 and the communication interface 10—three messages with two timed challenges/responses: The remote server 3 and the control circuit 6 count the time between the transmissions and arrivals of the messages. The server 3 sends to the control circuit 6 a first message comprising a signed order and a signed first data challenge. The command circuit 4 responds with a second message comprising a data item representative of an approval of the order, the first challenge data, and a second challenge data, all three being each signed with the sender's key. Then, the server 3 signs them all again in a third message sent back to the control circuit 6. If the time periods detected by the control circuit 6 or the server 3 are greater than a predetermined threshold, it is their responsibility not to finalize this transaction and therefore to prevent the execution of the order which would be delayed.

In a second embodiment of the time validity check, the control circuit 6 synchronizes an internal chronometer with the server 3 at the start of a secure exchange session, then uses it either to find out exactly when to trigger the order, or just to check that it is not being executed too late. This chronometer may be, but is not necessarily, an RTC, in order to limit the number of resynchronizations, and to maintain this even when the control circuit 6 enters deep sleep mode.

The synchronization or assessment of the difference between this chronometer and a chronometer within the server 3 is preferably secure, for example with a similar exchange to that seen in the first embodiment hereinbefore. This case has the disadvantage of requiring specific equipment in the case of the RTC, but obviates the need to have to perform the secure synchronization systematically for each order, and to obtain, for order executions, a more accurate time limit between the orders (subject to the accuracy of the RTC). For example, if it is necessary to start a sequence of actions with a tolerance of 1 s in relation to the sending of the order by the server 3, but that, then, this action sequence must be performed with a relative accuracy of 1 ms in relation to the start of this sequence, this method is particularly suitable.

Regardless of the type of authenticity check implemented, this check produces two possible results: a positive result whereupon the order is deemed to be authentic by the control device, and a negative result in the opposite case.

The control circuit 6 stores in its memory 12 the check result obtained (whether it is negative or positive) in a suitable manner to logically link the check result and the order having been checked. For example, an item of integrity data is stored in the memory 12 of the control circuit 6 relating to the order checked, as is a data item representative of the check result associated with the item of integrity data. The item of integrity data may be, for example, a digital footprint (or "hash") of the order, calculated by the control circuit using a predetermined hash function. Alternatively, the item of integrity data is the order itself or a portion of the order facilitating the identification of this latter.

In the case of a positive result, the control circuit 6 authorizes the command circuit 4 to command the peripheral 2 according to the order received (step 606). To do this, the control circuit 6 transmits to the command circuit 4 a second signal over the communication bus 8, this second signal transporting data representative of such an authorization (these data are called "GO" on FIG. 4).

Furthermore, the control circuit starts a chronometer associated with the order received in the event of a positive check result.

In the case of a negative result, the control circuit 6 does not authorize the command circuit 4 to command the peripheral 2 according to the order received (step 608, visible on FIG. 3). In this case, the second signal transports data representative of such an authorization refusal. Alternatively, the second signal is not in this case transmitted by the control circuit 6 to the command circuit 4.

When the command circuit 4 detects over the communication bus 8 a second signal carrying an authorization from the control circuit 6, the command circuit 4 transmits a third signal (step 404) over the communication bus 8. The third signal is a command signal of the peripheral 2 corresponding to the order received; it is called "CMD" in FIG. 4.

The control circuit 6 detects this third signal (step 610). It is initially assumed that the detection of this third signal occurred prior to the expiry of a predetermined time limit that began when the counter started.

In one embodiment, the third signal is directly addressed to the peripheral 2, i.e. the third signal uses as a destination address an address specific to the peripheral 2 on the communication bus 8. In this case, the control circuit 6 is configured to intercept the third signal despite the fact that it is not the recipient of it; to do this, the address of the peripheral 2 may be stored in the memory of the control circuit 6, in addition to the specific address of the control circuit 6. In another embodiment, the third signal is addressed directly to the control circuit 6.

The control circuit 6 implements a cross-verification of this third signal, this cross-verification consisting of checking whether the control circuit 6 has given prior authorization to the command circuit 4 to emit this third signal or not (step 612). In other words, the control circuit 6 verifies whether the order represented by the third signal has indeed been checked beforehand by it during an implementation of step 604, and that this check has produced a positive result.

The verification 612 performed by the control circuit 6 typically comprises a comparison between data transported by the third signal and the content of its memory. For example, the third signal transports an order identifier, and the control circuit 6 searches for this identifier in its memory. If the order identifier is present in the memory, this means at least that the order in question has been subjected to a prior authenticity check by the control circuit 6. The outcome of this prior authenticity check now remains to be seen. To do this, the control circuit 6 inspects the value of the check result stored in the memory in association with the identifier found. If this check result stored is positive, this means that the command circuit 4 has definitely authorized the command circuit 4 to transmit the third signal. If this check result is negative, this authorization has not been given by the control circuit 6.

Alternatively, the verification 612 compares an item of integrity data relating to the content of the third signal with the content of the memory 12. This item of integrity data is obtained in the same manner as that used during the control step. When the control circuit 6 uses a hash function to calculate an item of integrity data relating to an order during the check 604, that same function is used to calculate a second digital footprint relating to the third signal. If, in the memory 12, an item of integrity data exists which is identical to the item of integrity data relating to the third signal, this means that prior authorization occurred for the command circuit to transmit the third signal. If, during the verification 612, no item of integrity data is found in the memory 612 which is equal to the item of integrity data relating to the third signal, it is considered that the third signal has not received prior authorization by the control circuit 6.

If the cross-verification 612 reveals that the control circuit 6 has given prior authorization for the command circuit 4 to emit the third signal, the control circuit 6 can remain passive. The peripheral 2 detects the third signal and executes the action imparted by the order received and having been assessed as authentic by the control circuit 6.

The control circuit 6 may also inform the server 3 of the positive result of the cross-verification. To do this, the control circuit 6 generates a message which indicates that the command circuit 4 has attempted to command the peripheral 2 according to an authentic order (which constitutes normal behavior). The control circuit 6 transmits over the communication bus 8 a signal transporting this message, intended for the command circuit 4. The command circuit 4 then relays the message to the remote server 3 via the communication interface 10. The sending of this message may be immediate or delayed. The message may, in particular, comprise a signed data item, for example using the second key, confirming that the command to the peripheral 2 made by the command circuit 4 has been made with data which were in the authentic order received beforehand (authentic confirmation of execution (of authentic order)).

If the cross-verification reveals instead that the control circuit 6 has not given prior authorization for the command circuit 4 to transmit the third signal (either because the order transported by the third signal has not been subjected to an authenticity check, or because such a check culminated in a negative result), then the command circuit 4 implements protection measures (step 614).

It has been assumed up to now that the command circuit 4 receiving authorization from the control circuit 6 emits the third command signal. However, it may be that the command circuit 4 is not operating normally, for example, following an attack, and that for this reason, step 404 of emitting the third signal is delayed, or is not being implemented at all despite the authorization received. In these cases, the predetermined delay associated with the chronometer expires before the control circuit detects the third signal. The control circuit then triggers the protection measures of step 614.

Different types of protection measures implemented during step 614 may be envisaged.

A first protection measure consists of informing the server 3 of the negative result of the cross-verification. To do this, the control circuit 6 generates an error message which indicates that the command circuit 4 has attempted to command the peripheral 2 based on an inauthentic order. The control circuit 6 emits over the communication bus 8 a signal transporting this message, intended for the command circuit 4. The command circuit 4 then relays the message to the remote server 3 via the communication interface 10. The sending of the message may be immediate or delayed.

The control circuit 6 may, for example, store in its memory multiple results relating to different orders emitted by the server 3, and send a delayed fault report comprising all these results. For its part, if the trusted server 3 does not receive authentic confirmation of execution, it may then update an internal trust indicator, providing an indication of whether the connected object 1 has been compromised. A regular report system may be implemented to assure the server 3 that additional malicious orders have not been inserted by the command circuit 4 over the bus 8.

Although advantageous, this first protection measure has as a limitation the inability to manage what a potentially compromised object does until it is deactivated or replaced (physically or by software).

A second protection measure reducing the impact of this limitation is a blocking preventing the detected command signal, or even any command signal subsequently emitted by the command circuit 4, from being processed by the peripheral 2.

Such a blocking may be embodied in various ways.

Method 1: On a communication bus 8 which has a clock which times the sending of data, it is possible to stop this clock artificially. For example, on the I²C bus 8, this amounts to sounding the clock alarm at low level and only releasing it when the control circuit 6 makes the decision. In this example, certain I²C components are capable of waiting for the clock signal to be released before communicating, and it is therefore possible for the control circuit 6 to indefinitely pause a communication to block it. In this case, the control circuit 6 may deactivate its blocking upon receipt of an I²C START or STOP. On the I²C bus 8 this technique has the advantage of pausing, without totally stopping, the transaction. For additional security, the control circuit 6 may perform this action whilst monitoring the actual status of the clock line, to check whether it definitely remains stopped, and if that circuit detects a fault, a global reset system for the system may be triggered.

Method 2: The control circuit 6 may force the data signal so that the communication is blocked at the appropriate time.

On a communication bus 8 which transmits address information, it is possible to force the signal so that the address does not correspond with that of one of the secure peripheral components.

On a communication bus 8 which transmits an acknowledgment information, forcing the signal makes it possible to convince the transmitting component that the receiving component has not received the message, therefore normally leading to cancellation of the sequence (which may be circumvented by an attacker depending on the case).

When the useful data to be transmitted to the peripheral 2 is transmitted over the bus 8, it is possible in certain situations to ensure that the control circuit 6 electrically forces the signal to a value which it approves, by changing the status of the bus 8 to the value perceived by the peripheral component 2 i.e. a value predefined in the control circuit 6.

Method 3: The control circuit 6 may use an external signal which it generates (other than the data bus 8) in order to apply a control on the operation of the system:

A signal for resetting or interrupting the power supply to the peripheral 2 transmitted via the connection 16, making it possible to entirely stop the operation.

One (or several) address configuration signal(s) making it possible to force the non-selection of the peripheral component 2 when an address is sent over a bus 8 such as I²C.

The block implemented to prevent any action at the level of peripheral 2. It may be made by permanently applying any of the blocking methods explained herein before. However, methods 1 and 2 are the simplest to implement if the blocking must affect several peripheral components on the same bus 8.

This blocking may be used in the case where the control circuit 6 has detected a fault being recognized as an attack, or has received an order originating from the trusted server 3.

Depending on the type of blocking implemented, the control circuit 6 may find itself in a situation wherein it does not know which peripheral 2 the command circuit 4 is addressing, and which items of information are being transmitted. Consequently, unblocking such a system must therefore be performed via methods external to the use of the blocked data bus 8 (for example, using another data bus 8 to the control circuit 6, out-of-specification behavior on the protected data bus 8, timer or transaction counter internal to the control circuit 6 . . . ).

On a data bus 8 transmitting an address, the control circuit 6 may use one of the blocking Methods 1, 2, 3 listed hereinbefore to prevent the peripheral 2 from being addressed by the command circuit 4. In this case, the control circuit 6 may enter into a mode which no longer facilitates the addressing of certain peripherals 2, but can still itself receive orders originating externally, notably from the trusted server 3.

This blocking may be used in two contexts:

When it has been decided by the control circuit 6 or the trusted server 3 that the peripheral 2 which is being blocked should no longer receive communication until further notice.

The control circuit 6 authorizes communications one by one (or in a limited number) after having received signed authorization by the trusted server 3. This authorization may contain a maximum number of authorized communications, or a usage time limit. For example:

The command circuit 4 makes a request to the control circuit 6 for the peripheral 2 of address A The control circuit 6 approves the command circuit 4 make this request The control circuit 6 sends the addressing signal over the bus 8, and the control circuit 6 reads it but does not intervene as it authorized it The command circuit 4 is then compromised and attempts to make a new request by sending address A over the bus 8. This time, the control circuit 6 reads the address and prevents the addressing from being successfully completed in order to prevent the compromised command circuit 4 from sending a malicious request.

In another possible scenario, the command circuit 4 makes a request to the control circuit 6 to address the peripheral 2 of address A, but for whatever security reasons, the control circuit 6 denies this authorization, in this case either the command circuit 4 is not compromised (there may be other reasons for the denial by the control circuit 6), accepts the negative response from the control circuit 6, and does not attempt to transmit its request to the peripheral 2; or it is compromised, in which case, the previous point of the example applies.

On a communication bus 8 which uses an acknowledgment system, the control circuit 6 may use method 1 to force the acknowledgment signal to be delayed, whether at the address or data level, analyze the content of the transmitted data, then, in the case of a fault, employ method 1, 2 or 3 to prevent the use of these data by the peripheral 2.

Data may only be filtered when the peripheral 2 applies its response to the data received conditionally upon successful acknowledgment of the communication (in other words, if the peripheral 2 responds even if it is not capable of sending its acknowledgment, this technique will not be effective).

A third protection measure is the transmission by the control device of an appropriate security signal to place the peripheral 2 in a predetermined secure configuration. This third protection measure advantageously combines with a blocking according to Method 3. In this situation, the control circuit 6 would be configured beforehand with a sequence of data to be transmitted to the peripheral 2, and in the case of a blocking on bus 8, the control circuit 6 takes control of the bus 8 by becoming master, and sends this sequence over the bus 8, so that the peripheral 2 returns to a default status suited to the application.

When the peripheral 2 is an actuator, the secure configuration may be a predetermined secure position. For example, if the peripheral 2 is an actuator opening a lock, and if the secure position keeps the lock closed, this means that in the case of a fault, the control circuit 6 will send over the bus 8, to the peripheral 2 a data item resulting in the closure of the lock.

The invention claimed is:

1. A method for controlling commands suitable to be processed by a peripheral, the method comprising the following steps implemented by a control circuit directly connected to a communication bus, a command circuit and the peripheral also being directly connected to the communication bus:
    receiving a request indicating that the command circuit requests an authorization from the control circuit to send a command signal in the communication bus for the peripheral,
    granting or not the authorization to the command circuit,
    implementing protection measures whenever the control circuit detects that: the command signal has been sent by the command circuit in the communication bus after the control circuit has not granted the authorization, or that the command signal has not been sent in the communication bus after the control circuit has granted the authorization,
    wherein the authorization is not granted by the control circuit when the control circuit detects that the command signal of the peripheral is not based on an order authentically transmitted by a predetermined server.

2. The method of claim 1, wherein the control circuit is configured to check whether the order has been electronically signed by the server and/or whether the order is accompanied by an authentication code generated by the server.

3. The method according to claim 2, wherein the control circuit also implements the following steps:
    storing an item of integrity data relating to the order prior to the control circuit granting or not the authorization,
    if the command signal has been sent by the command circuit, implement an integrity check of the command signal using the stored item of integrity data, the protection measures being implemented if the integrity check reveals that the command signal is not correct.

4. The method according to claim 2, wherein the protection measures comprise the server being sent an error message relating to the command of the peripheral.

5. The method according to claim 2, comprising the server being sent a message indicating that the control circuit granted the authorization and that the command signal was then sent by the command circuit in the communication bus.

6. The method according to claim 1, wherein the authorization is not granted by the control circuit when the control circuit detects that a period of validity of an order on which the command signal for the peripheral is based has expired.

7. The method according to claim 1, wherein the protection measures comprise blocking the command signal to prevent the command signal from being processed by the peripheral.

8. The method according to claim 7, wherein blocking the command signal comprises at least one of the following steps:
    positioning a clock signal controlling the timing of the sending of data over the communication bus at a suitable level to interrupt the transmission of the command signal of the peripheral detected, before the detected command reaches the peripheral;
    replacing an address designating the peripheral as a recipient of the detected command signal with a different address,
    emitting over the communication bus a suitable deactivation signal to place the peripheral in a deactivated configuration unsuitable for processing the detected command.

9. The method according to claim 1, wherein the protection measures comprise the emitting by the control device of a security command signal suitable for placing the peripheral in a predetermined secure configuration.

10. The method according to claim 1, wherein the peripheral is an actuator.

11. The method according to claim 8, wherein the deactivation signal is a signal for resetting or interrupting a power supply of the peripheral.

12. A control circuit for controlling commands suitable to be processed by a peripheral, the control circuit being configured to:
    be directly connected to a communication bus directly connected to a command circuit and to the peripheral,
    receive a request indicating that the command circuit requests authorization from the control circuit to send a command signal in the communication bus for the peripheral,
    grant or not the authorization to the command circuit,
    implement protection measures when the control circuit detects that the command signal has been sent by the command circuit in the communication bus after the control circuit has not granted the authorization, or that the command signal has not been sent by the command circuit in the communication bus after the control circuit has granted the authorization,
    wherein the authorization is not granted by the control circuit when the control circuit detects that the command signal of the peripheral is not based on an order authentically transmitted by a predetermined server.

13. A system comprising a peripheral, a command circuit, a control circuit according to claim 12, and a communication bus, wherein the peripheral, the command circuit and the control circuit are all directly connected to the communication bus.

14. A connected object comprising the system according to claim 13.

* * * * *